(12) United States Patent
Huang et al.

(10) Patent No.: US 10,389,420 B1
(45) Date of Patent: Aug. 20, 2019

(54) ANTENNA SWITCHING SYSTEM

(71) Applicant: WISTRON NEWEB CORPORATION, Hsinchu (TW)

(72) Inventors: Ching-Feng Huang, Hsinchu (TW); Yung-Jinn Chen, Hsinchu (TW); Tsung-Tsung Huang, Hsinchu (TW); Yu-Meng Yen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 15/963,138

(22) Filed: Apr. 26, 2018

(51) Int. Cl.
| H04B 7/06 | (2006.01) |
| H04W 52/02 | (2009.01) |
| H04B 1/40 | (2015.01) |

(52) U.S. Cl.
CPC ...... H04B 7/0602 (2013.01); H04W 52/0206 (2013.01); H04B 1/40 (2013.01)

(58) Field of Classification Search
CPC .... H04B 7/0602; H04B 1/40; H04W 52/0206
See application file for complete search history.

(56) References Cited

U.S. PATENT DOCUMENTS

| 5,874,915 A * | 2/1999 | Lee .................. H01Q 3/242 342/372 |
| 7,405,695 B2 | 7/2008 | Liu |
| 2005/0117545 A1 | 6/2005 | Wittwer et al. |
| 2006/0145919 A1* | 7/2006 | Pleva .................. H01Q 1/3283 342/368 |
| 2009/0270051 A1* | 10/2009 | Choi .................. H04B 7/0617 455/101 |
| 2010/0226292 A1 | 9/2010 | Gorbachov |
| 2011/0003563 A1 | 1/2011 | Gorbachov |
| 2013/0017860 A1* | 1/2013 | Chen .................. H01Q 1/241 455/556.1 |
| 2019/0020402 A1* | 1/2019 | Gharavi .............. H04B 17/318 |

OTHER PUBLICATIONS

USPTO, Office action dated Feb. 8, 2019 regarding the U.S. Appl. No. 15/963,719.

* cited by examiner

*Primary Examiner* — Kenneth T Lam
(74) *Attorney, Agent, or Firm* — Li & Cai Intellectual Property (USA) Office

(57) ABSTRACT

An antenna switching system is provided. The system includes a radio frequency (RF) circuit for transceiving signals, N antennas, a master switch, N switches, and N power dividers. The signals may be transmitted by one of the N antennas, or the signals are transmitted by the antennas of the N antennas.

15 Claims, 15 Drawing Sheets

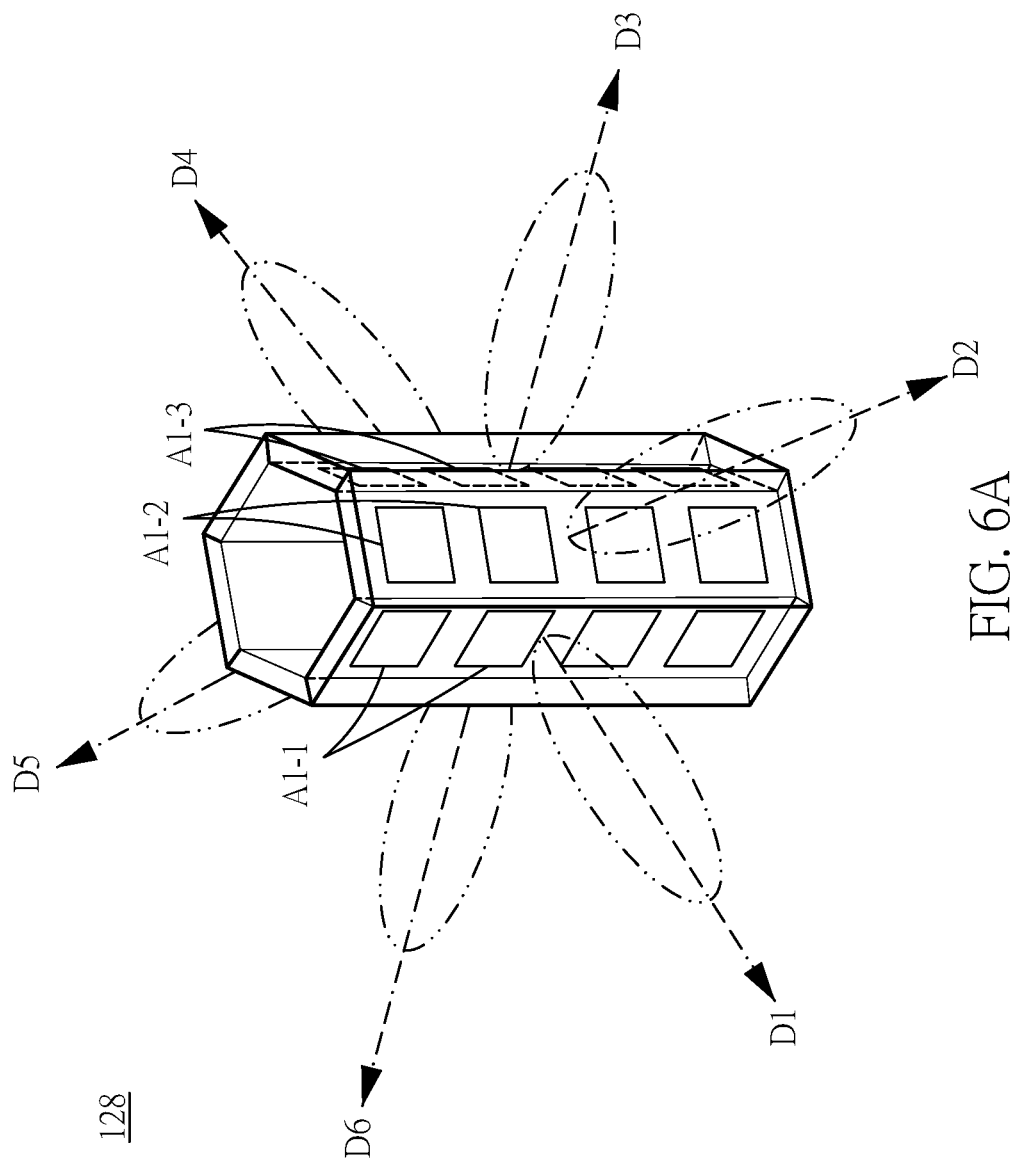

ANTENNA SWITCHING SYSTEM

BACKGROUND OF THE INVENTION

1. Field of the Invention

The present disclosure relates to an antenna switching system that utilizes a novel circuit to meet the requirements of a single beam operation and a combined beam operation for a smart antenna.

2. Description of Related Art

The smart antenna plays an important role in the existing and next-generation wireless communication systems, which has the advantages of improving the efficiency of spectrum resources, system capacity, and communication quality. One of main functions of the smart antenna technology is beamforming. A beamforming technology is for creating the radiation pattern for a beam to direct in a particular direction, and includes a switched beamforming technique and an adaptive beamforming technique.

The switched beamforming technique utilizes multiple beams that point in different directions so as to cover the entire communication area. When a user device, such as a wireless mobile device, enters one Beam Footprint covered by a specific beam, the smart antenna may be switched to the specific beam, which maximizes the received signal strength indication (RSSI) and the signal to noise ratio (SNR). Since the switched beamforming technique is simple and does not require complicated calculations, the smart antenna with switched beamforming technique is still one of the most widely used types in the field.

FIG. 1 shows a schematic diagram of a conventional switched beamforming circuit. As shown in the figure, six diode switching circuits are provided, and each Horizontal-polarized antenna sector is controlled by one diode switching circuit for turning the RF signal on or off. Each diode switching circuit consists of a bias circuit, a diode, a control circuit, and a matching network (MN). Theoretically, the impedance matching network (MN1, MN2) can achieve a 50-ohm matching between radio frequency circuit RF1 and one of the antenna sectors when any one of the diode switching circuits is turned on to form a single beam.

When two adjacent diode switching circuits need to be turned on to form a combined beam, the parallel impedance would become 50-ohm//50-ohm=25-ohm, therefore, the impedance matching would not able to be achieved between the parallel impedance and the impedance matching network MN1.

Moreover, when the adjacent two diode switching circuits are turned on to form a combined beam, causing poor isolation between two antenna sectors since the impedances thereof are not matched, and the isolation is not good between the adjacent two diode switching circuits, such that the efficiency of the combined beam would be low.

The bias voltage for the diode is generally about 3.3V. Therefore, in order to provide a voltage to reach a reverse bias for the diode to turn off the diode, the control circuit must able to provide the reverse bias voltage greater than 3.3V which is generally about 5V or 12V. In order to supply voltages greater than 5V, the system mainboard may require a DC to DC converter, which may increase the costs.

Therefore, a novel antenna switching system is needed to meet the requirements of the single beam and the combined beam required for a smart antenna, while achieving low costs and low operation voltage.

SUMMARY OF THE INVENTION

According to an embodiment of the present disclosure, there is provided an antenna switching system including a first radio frequency (RF) circuit for transceiving signals, a first switch circuit, and a plurality of first antennas. The first switch circuit includes a master switch, a plurality of power dividers and a plurality of switches. The master switch includes a first common port, a plurality of power divider (PD) ports and a plurality of first ports. The first common port is electrically connected to the first RF circuit, and a number of the plurality of PD ports is equal to a number of the plurality of first ports and is an integer equals to or larger than 3. The plurality of power dividers each includes a second common port, a second port and a third port. A number of the plurality of power dividers is equal to the number of the plurality of PD ports, and the second common ports of the plurality of power dividers are electrically connected to the plurality of PD ports, respectively. The plurality of switches, each includes a third common port, a fourth port, a fifth port and a sixth port. A number of the plurality of switches is equal to the number of the plurality of first ports, the fourth ports of the plurality of switches are electrically connected to the plurality of first ports, respectively, the fifth ports of the plurality of switches are electrically connected to the second ports of the plurality of power dividers, respectively, the sixth ports of the plurality of switches are electrically connected to the third ports of the plurality of power dividers, respectively, and the fifth port and the sixth port of each of the plurality of switches are electrically connected to different ones of the plurality of power dividers, respectively. The plurality of first antennas are electrically connected to the third common ports of the plurality of switches, respectively, and a number of the plurality of first antennas is equals to the number of the plurality of switches. When the first common port is switched to one of the plurality PD ports electrically connected to a selected one of the plurality of power dividers, the fifth port electrically connected to the selected one of the plurality of power dividers is switched to the third common port, and the sixth port electrically connected to the selected one of the plurality of power dividers is switched to the third common port.

According to another embodiment of the present disclosure, there is provided an antenna switching system including a radio frequency (RF) circuit for transceiving signals, N antennas, a master switch, N switches, and N power dividers. The master switch is electrically connected to the RF circuit. An $i^{th}$ switch of N switches is electrically connected between the master switch and a $i^{th}$ antenna of the N antennas, where i is an integer from 1 to N, and N is an integer equal to or larger than 3. A $j^{th}$ power divider of the N power dividers is electrically connected between the master switch and a $j^{th}$ switch of the N switches, and between the master switch and a $(j+1)^{th}$ switch of the N switches, where j is an integer from 1 to N−1, and a $N^{th}$ power divider of the N power dividers is electrically connected between the master switch and a $N^{th}$ switch, and between the master switch and a $1^{st}$ switch of the N switches. The signals are transmitted by one of the N antennas, or the signals are transmitted by the antennas of the N antennas corresponding to the switches connected to one of the N power dividers.

According to yet another embodiment of the present disclosure, there is provided an antenna switching system including a radio frequency (RF) circuit for transceiving signals and a switch circuit. The switch circuit includes a master switch, a first switch, a second switch, a third switch, a first power divider (PD) and a second power divider (PD). The master switch includes a first common port, a first power divider (PD) port and a second PD port, a first port, a second port, and a third port, and the first common port is electrically connected to the first RF circuit. The first switch is electrically connected to a first antenna and the master switch. The second switch is electrically connected to a second antenna and the master switch. The third switch is electrically connected to a third antenna and the master switch. The first power divider (PD) and a second power divider (PD) each includes a second common port, a fourth port and a fifth port. The second common ports of the first PD and the second PD are electrically connected to the first PD port and the second PD port, respectively, the fourth ports of the first PD and the second PD are electrically connected to the first switch and the second switch, respectively, and the fifth ports of the first PD and the second PD are electrically connected to the second switch and the third switch, respectively. When the first common port is switched to the first PD port, a radiation pattern formed by the first antenna and the second antenna is toward to a first direction, and when the first common port is switched to the second PD port, a radiation pattern formed by the second antenna and the third antenna is toward to a second direction.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

FIG. 6A shows a schematic diagram of the antenna array according to another embodiment of the present disclosure;

DETAILED DESCRIPTION OF THE PREFERRED EMBODIMENTS

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
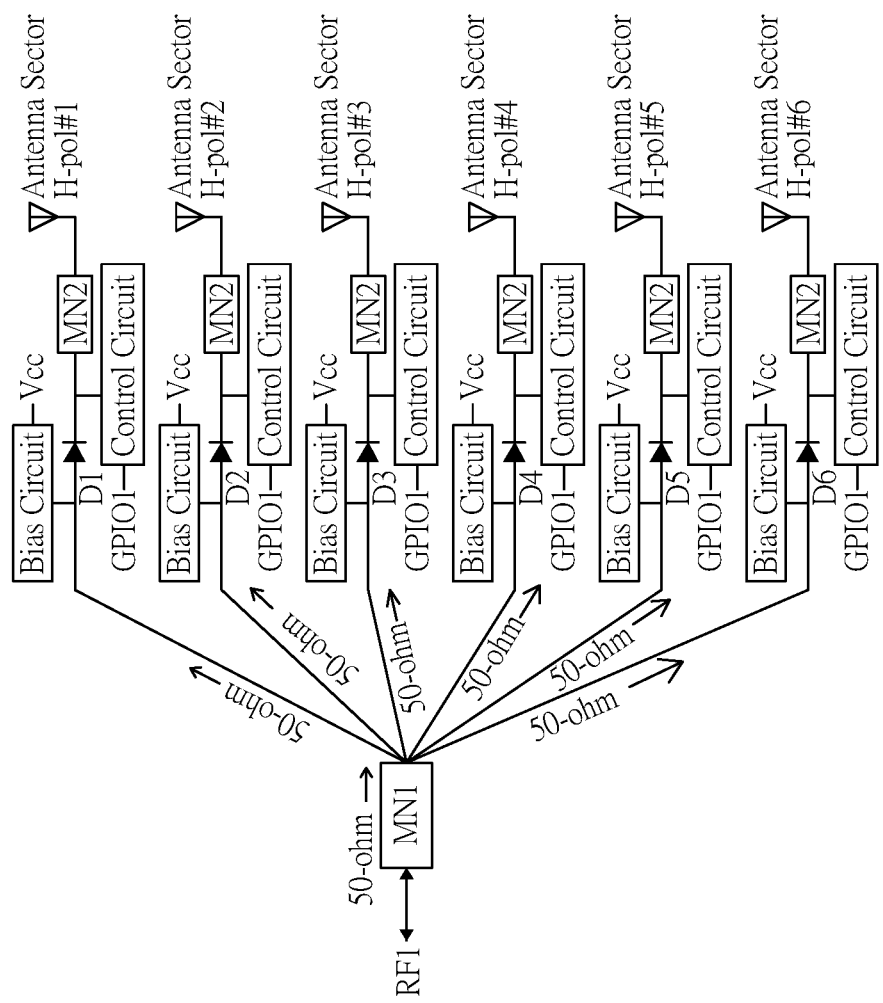
FIG. 1 shows a schematic diagram of a conventional switched beamforming circuit.
Figure 2:
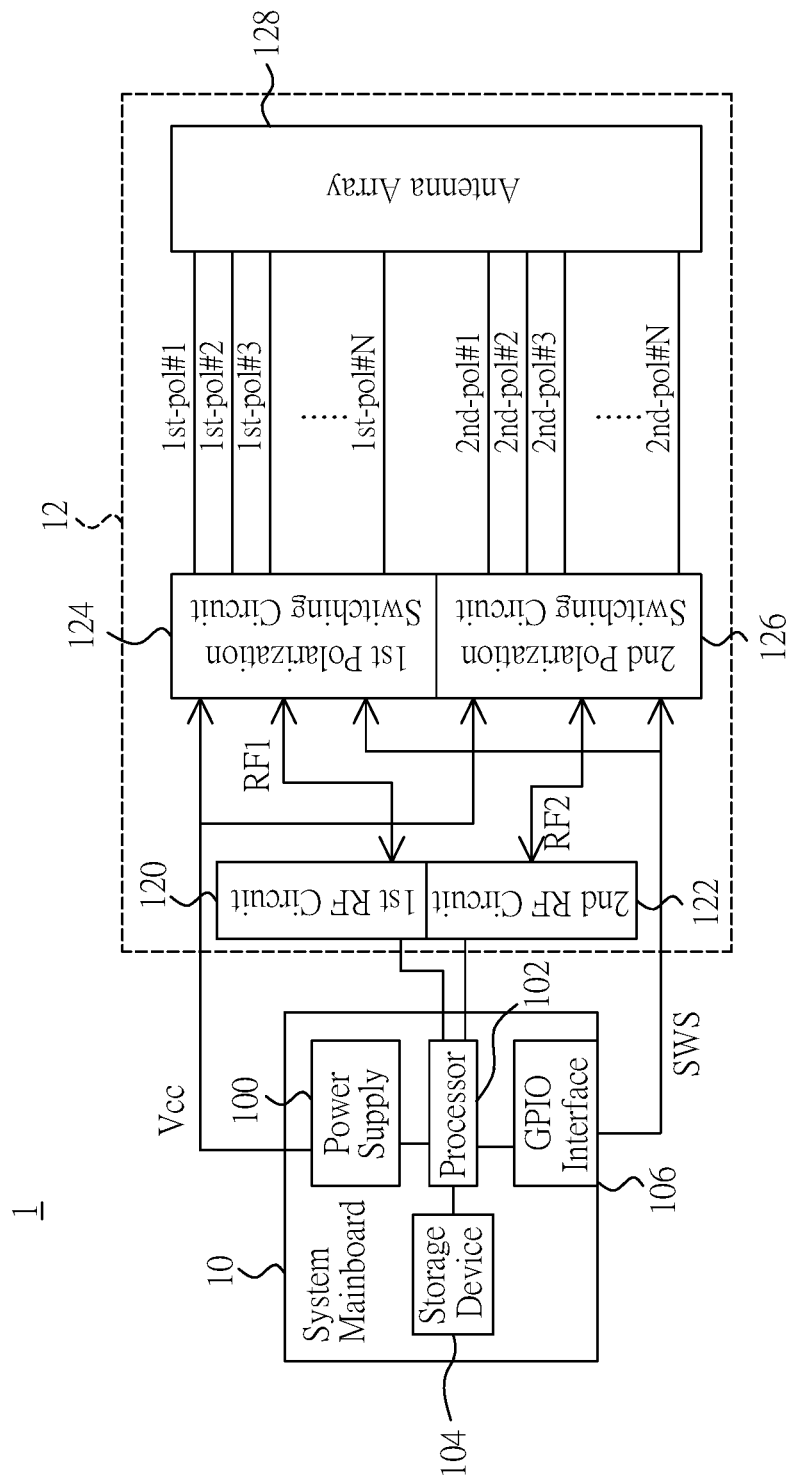
FIG. 2 is a block diagram illustrating an antenna system constructed according to an embodiment of the present disclosure.

FIG. 2 is a block diagram illustrating an antenna system constructed according to an embodiment of the present disclosure. Referring to FIG. 2, the antenna system 1 is adapted to be applied in a wireless transmission device, such as a wireless router. The wireless communication system architecture of the antenna system 1 includes a system mainboard 10 and an antenna switching system 12. The system mainboard 10 includes a power supply 100, a processor 102, a storage device 104, and a general purpose input/output (GPIO) interface 106. The antenna switching system 12 includes a first radio frequency (RF) circuit 120, a second RF circuit 122, a first polarization switching circuit 124, a second polarization switching circuit 126, and an antenna array 128. In another embodiment, the first radio frequency (RF) circuit 120, the second RF circuit 122, the first polarization switching circuit 124 and the second polarization switching circuit 126 may be disposed on the system mainboard 10.

The processor 102 is electrically connected to the power supply 100, the storage device 104, and the general purpose input/output (GPIO) interface 106, respectively. The processor 102 may include any custom-made or commercially available processor, a central processing unit (CPU), or application specific integrated circuits (ASICs).

The storage device 104 can include any one of a combination of volatile memory elements (e.g., random-access memory (RAM, such as DRAM, and SRAM, etc.)) or nonvolatile memory elements.

The power supply 100 may include a power source, a regulator, and a power management module to provide the required power to the processor 102 and the antenna switching system 12.

Each of the first RF circuit 120 and the second RF circuit 122 may be a transceiver or an RF IC, and it can generate a transmission signal to the first polarization switching circuit 124 or the second polarization switching circuit 126 or process a reception signal from the first polarization switching circuit 124 or the second polarization switching circuit 126. The first RF circuit 120 and the second RF circuit 122 may each include a power amplifier.

The processor 102 may provide control signals to the first RF circuit 120 and the second RF circuit 122 for transmitting and receiving signals RF1 and RF2 through the first polarization switching circuit 124 and the second polarization switching circuit 126, respectively, and the processor 102 may provide switching signals SWS to the first polarization switching circuit 124 and the second polarization switching circuit 126 through GPIO interface 106. In order to form the desired single beam and combined beam, the processor 102 is configured to execute the antenna switching algorithm stored in the storage device 104 to control the first polarization switching circuit 124 and the second polarization switching circuit 126 to be switched to certain antenna(s) of the antenna array 128. The antenna array 128 includes a plurality of antennas electrically connected to the first polarization switching circuit 124 and the second polarization switching circuit 126 via wires 1 st-pol#1 to 1 st-pol#N and wires 2nd-pol#1 to 2nd-pol#N assigned to multiple antenna sectors. Each antenna sectors can provide two types of polarization operation, for example, Horizontal polarization and Vertical polarization operations, so the entire antenna array 128 has a plurality of Horizontal polarization feeding points and a plurality of Vertical polarization feeding points. Furthermore, different types of linear polarization and circular polarization operations may also be provided.

Although the first RF circuit 120, the second RF circuit 120, the first polarization switching circuit 124 and the second polarization switching circuit 126 are provided in the present embodiment, the antenna switching system may include merely one RF circuit and one polarization switching circuit.

Figure 3:
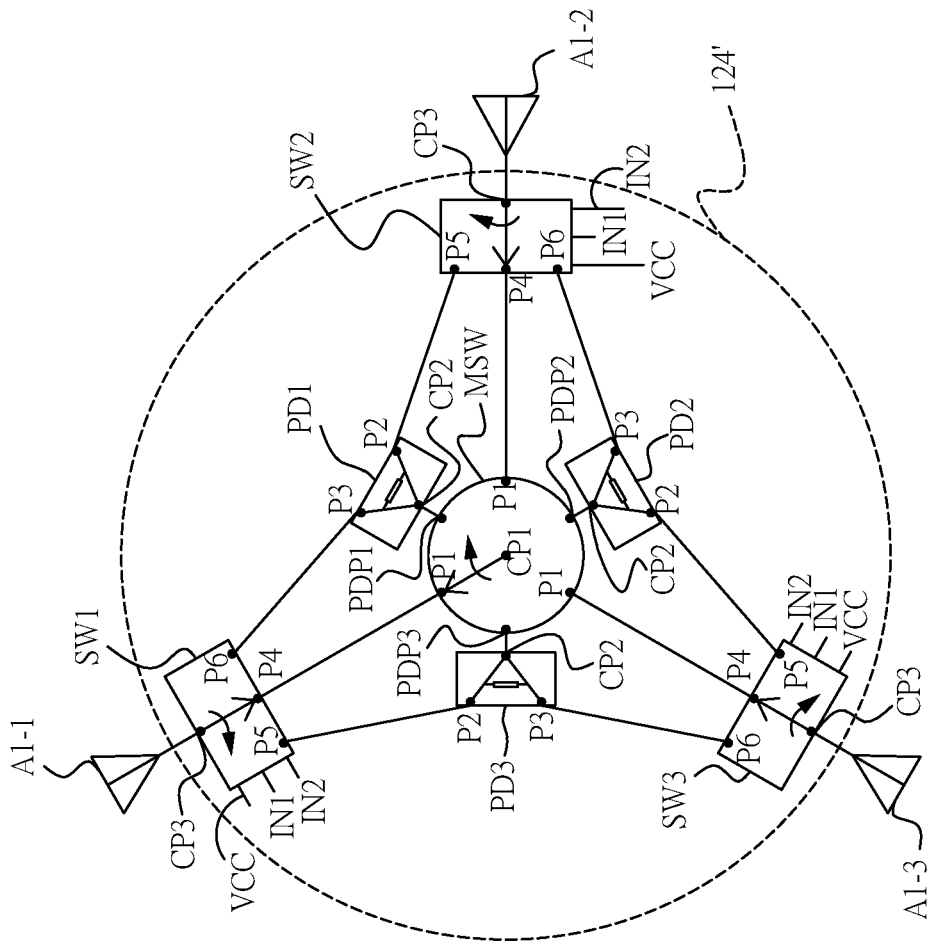
FIG. 3 is a circuit diagram illustrating an antenna switching system constructed according to an embodiment of the present disclosure.

Reference is now made to FIG. 3, which is a circuit diagram illustrating an antenna switching system constructed according to an embodiment of the present disclosure. The antenna switching system 12 includes the first RF circuit 120, a first switch circuit 124', and three first antennas A1-1, A1-2 and A1-3. The first switch circuit 124' includes a master switch MSW, three power divider PD1, PD2 and PD3, and three switches SW1, SW2 and SW3. The master switch MSW may be a single pole six throw (SP6T) switch, which includes a first common port CP1, three power divider (PD) ports PDP1, PDP2 and PDP3, and three first ports P1, the first common port CP1 is electrically connected to the first RF circuit 120, and a number of the plurality of PD ports PDP1, PDP2 and PDP3 is equal to a number of the plurality of first ports P1.

Each of the power dividers PD1, PD2 and PD3 includes a second common port CP2, a second port P2, and a third port P3. The second common ports CP2 are electrically connected to the PD ports PDP1, PDP2 and PDP3 of the master switch MSW, respectively.

In detail, the power dividers used herein are passive microwave components used for power division or power combining. In power division, an input signal is divided into two (or more) output signals of lesser power, while a power combiner accepts two or more input signals and combines them at an output port. The coupler or divider may have three ports, four ports, or more, and may be (ideally) lossless. Three-port networks take the form of T-junctions and other power dividers, while four-port networks take the form of directional couplers and hybrids. Power dividers usually provide in-phase output signals with an equal power division ratio (3 dB), but unequal power division ratios are also possible.

In this case, a Wilkinson power divider may be utilized, which is such a network with the useful property of appearing lossless when the output ports are matched; that is, only reflected power from the output ports is dissipated.

The three switches SW1, SW2 and SW3, each may be a single pole triple throw (SP3T) switch and includes a third common port CP3, a fourth port P4, a fifth port P5, and a sixth port P6, and a number of the switches SW1, SW2 and SW3 is equal to the number of the first ports P1. The fourth ports P4 of the switches SW1, SW2 and SW3 are electrically connected to the first ports P1, respectively, the fifth ports P5 of the switches SW1, SW2 and SW3 are electrically connected to the second ports P2 of the power dividers PD1, PD2 and PD3, respectively, the sixth ports P6 of the switches SW1, SW2 and SW3 are electrically connected to the third ports P3 of the power dividers PD1, PD2 and PD3, respectively, and the fifth port and the sixth port of each of the switches SW1, SW2 and SW3 are electrically connected to different ones of the power dividers PD1, PD2 and PD3, respectively.

The master switch MSW is powered by a power line VCC and controlled by control line set CON1 to select one signal path for the first common port CP1 to transmit/receive RF signals through one of the first ports P1, or one of the PD ports PDP1, PDP2 and PDP3. In other words, according to the control line set CON1 given to the master switch MSW, the master switch MSW couples the first RF circuit 120 to either one of the three first ports P1, or one of the PD ports PDP1, PDP2 and PDP3.

Each of the switches SW1, SW2 and SW3 is powered by a power line VCC and controlled by control lines IN1 and IN2 to select a signal path for the third common port CP3 to transmit/receive RF signals through the fourth port P4, the fifth port P5, or the sixth port P6. In other words, according to the control lines IN1 and IN2 given to the switches SW1, SW2 and SW3, the switches SW1, SW2 and SW3 are configured to couple the first antennas A1-1, A1-2 and A1-3 to either the first ports P1, or the power divider PD1, PD2 and PD3. Since each of the switches SW1, SW2 and SW3 may be SP3T, and control lines IN1 and IN2 are 2 bits, four combinations may be provided for satisfying the switching combinations of the SP3T.

The three first antennas A1-1, A1-2 and A1-3 coupled to the third common ports CP3 of the three second switches SW1, SW2 and SW3, respectively.

The present embodiment is an example of the antenna switching system with two antenna sectors. All of the switches can be switched and controlled by the processor 102 through the GPIO interface GPIO. First, when single-beam operation of the first antenna A1-1 is to be achieved, the first common port CP1 of the master switch MSW is switched to the first port P1 coupled to the switch SW1, and the third common port CP3 of the switch SW1 is also switched to the fourth port P4. Similarly, when single-beam operation of the first antenna A1-2 or A1-2 is to be achieved, the master switch MSW and the switch SW2 or SW3 perform switching operation as similar as the switching operation described above.

Secondly, when a combined-beam operation of the first antennas A1-1 and A1-2 is to be achieved, the first common port CP1 of the master switch MSW is switched to the PD port PDP1, and the third common port CP3 of the switch SW1 is switched to the sixth port P6, and the third common port CP3 of the switch SW2 is switched to the fifth port P5. When RF signals pass through the 3 dB power divider PD, the power divider PD divides or combines the RF signals of adjacent antenna sectors to transmit or receive signals.

An important consideration in achieving a combined-beam is the phase balance of the two synthesis paths. Otherwise, the RF signals are easily subtracted from each other at the time of synthesis. Therefore, the SP3 Ts of the three switches SW1, SW2 and SW3 may be identical, for example, using the same model of components. The antenna switching system provided in the present disclosure has a symmetrical architecture, such that the required phase balance may be easily achieved. Furthermore, the low return loss, low insertion loss and equal insertion loss and phases between the two synthesis paths may also be achieved by utilizing the symmetrical architecture.

Figure 4A:
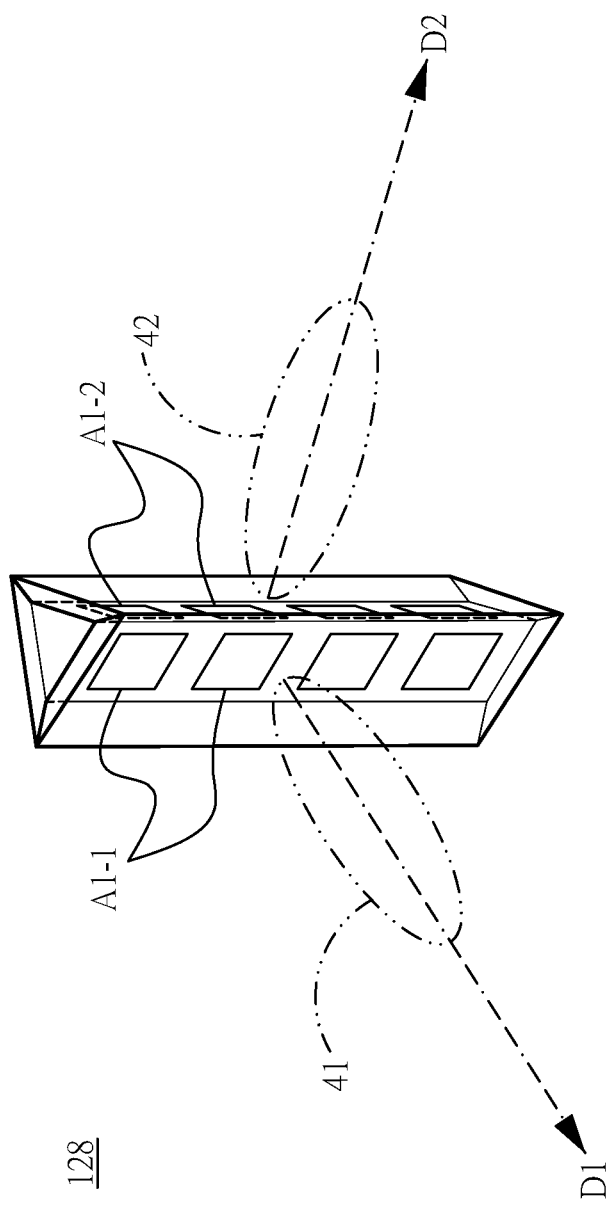
FIG. 4A shows a schematic diagram of the antenna array according to an embodiment of the present disclosure.
Figure 4B:
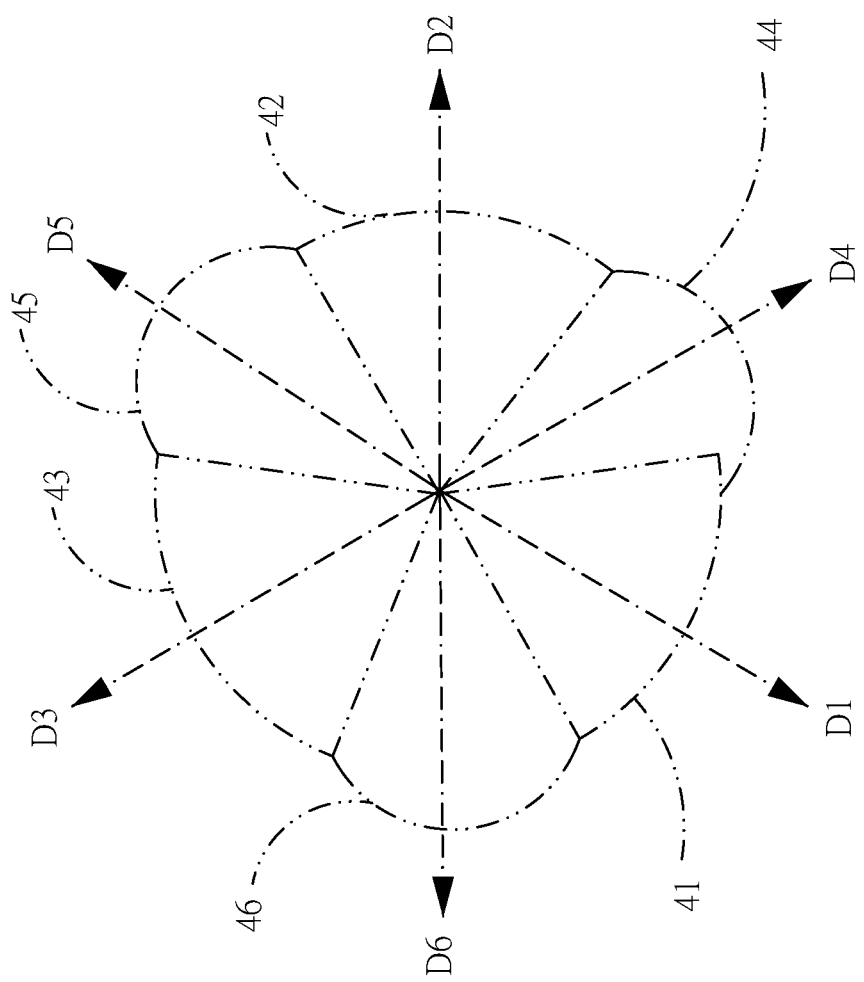
FIG. 4B shows a radiation pattern of the antenna array according to the embodiment of the present disclosure.

Reference is now made to FIGS. 4A and 4B. FIG. 4A shows a schematic diagram of the antenna array according to an embodiment of the present disclosure, FIG. 4B shows a radiation pattern of the antenna array according to the embodiment of the present disclosure.

The antenna array of FIG. 4A includes three antenna sectors. Each antenna sector covers a sector area of about 120 degrees. Each of the antenna sectors includes four antennas. Each antenna sectors has, for examples, the first antennas A1-1, A1-2 and A1-3 (not shown). Each antenna sector forms a single beam that can transmit and receive RF signals individually, and can also be combined with adjacent antenna sectors to form a combined beam to transmit and receive RF signals. As shown in FIG. 4B, a first radiation pattern 41 formed by the first antenna A1-1 is toward to a first direction D1, a second radiation pattern 42 formed by the first antenna A1-2 is toward to a second direction D2, a third radiation pattern 43 formed by the first antenna A1-3 is toward to a third direction D3, and when the first common port CP1 is switched to the PD port PDP1, a radiation pattern formed by the first antenna A1-1 and A1-2 is toward to a fourth direction D4. Therefore, a angle resolution of radiation patterns can be increased by two single beams and one combined beam. Radiation patterns 44, 45, and 46 may further be formed by the first antenna A1-1 and A1-2, A1-2 and A1-3, and A1-3 and A1-1, respectively. The total number of radiation patterns for all single beams and combined beams are 6, and the radiation patterns 41, 42, 43, 44, 45, and 46 with different angles provide a communication area without any dead corner.

Figure 5:
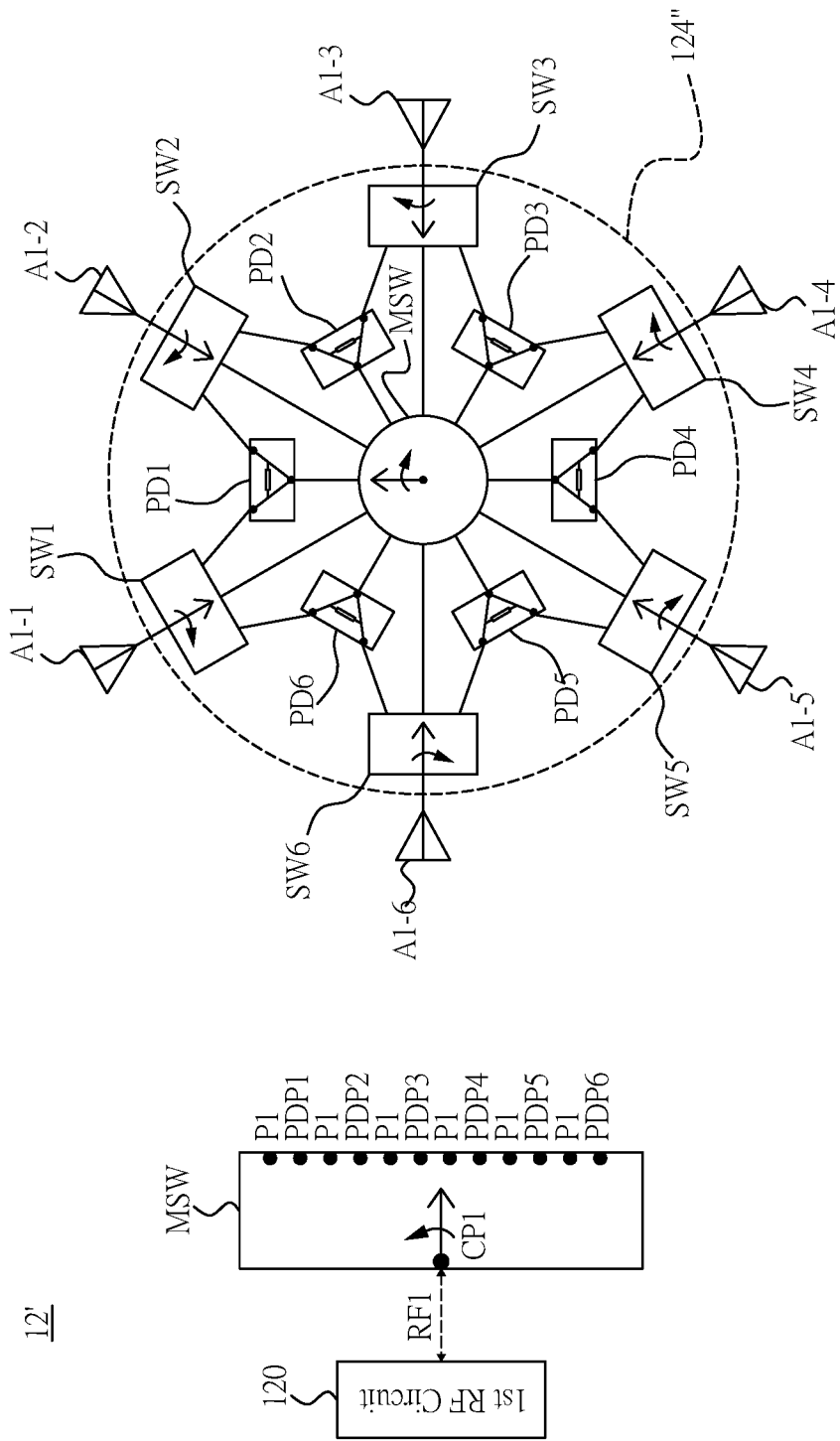
FIG. 5 is a circuit diagram illustrating an antenna switching system constructed according to another embodiment of the present disclosure.

Reference is now made to FIG. 5, which is a circuit layout illustrating an antenna switching system constructed according to another embodiment of the present disclosure. As shown in FIG. 5, the antenna switching system 12' includes the first RF circuit 120, a first switch circuit 124", and six first antennas A1-1 through A1-6. In the present embodiment, the first RF circuit 120, the power dividers PD1 thorough PD6, and the switches SW1 through SW6 are as the same as those depicted in the FIG. 3, therefore, the repeated descriptions are omitted.

Differently, the master switch MSW may include six first ports P1 and six PD ports PDP1 through PDP 6, and may be a single pole twelve throw (SP12T) switch. The first switch circuit 124" in the present embodiment further includes two three switches SW4, SW5 and SW6 and three power dividers PD4, PD5 and PD6. Each of the three switches SW4, SW5 and SW6 may be a SP3T switch and may each includes a third common port CP3, fourth, fifth and sixth ports as mentioned in the previous embodiment. Reference numerals of the ports of the power dividers PD1 thorough PD6 and the switches SW1 through SW6 will be omitted hereinafter to avoid repeated descriptions.

The six first antennas A1-1 through A1-6 are respectively coupled to the third common ports of the switches SW1 through SW6. The third common port of each of the switches SW1 through SW6 is selectively switched to one of the fourth, fifth, and sixth ports. In more detail, each of the switches SW1 through SW6 is powered by a power line and controlled by control lines to select one signal path for the third common port to transmit/receive RF signals through one of the fourth, fifth, and sixth ports. In other words, according to the signals given to the switches SW1 through SW6 via the control lines, the switches SW1 through SW6 couples the third common port to either one of the fourth, fifth, and sixth ports.

The present embodiment is an example of the antenna switching system with six antenna sectors. All of the switches can be switched and controlled by the processor 102 through the GPIO interface GPIO. First, when single-beam operation of one of the first antenna A1-1 through A1-6 is to be achieved, the first common port CP1 of the master switch MSW is switched to one of the first ports P1, the third common port CP3 of the switches SW1 through SW6 coupled to the selected one of the first antennas A1-1 through A1-6 is also switched to the fourth port.

Secondly, when a combined-beam operation of one of the combinations between the first antennas A1-1 and A1-2, between the first antennas A1-2 and A1-3, between the first antennas A1-3 and A1-4, between the first antennas A1-4 and A1-5, between the first antennas A1-5 and A1-6, and between the first antennas A1-6 and A1-1 is to be achieved, the first common port CP1 of the master switch MSW is switched to one of the PD ports PDP1 through PDP6 corresponding to the selected combination of two first antennas among the first antennas A1-1 through A1-6, the two switches among the six switches SW1 through SW6 coupled to the selected combination of two first antennas among the first antennas A1-1 through A1-6 are switched to couple the two first antennas to the selected power divider. When RF signals pass through the 3 dB power divider PD, the power divider PD divides or combines the RF signals of adjacent antenna sectors to transmit or receive signals.

Although the six first ports P1, the six power dividers PD1 through PD6, the six switches SW1 through SW6, and the six first antennas A1-1 through A1-6 are provided, the numbers of these components are not limited to the present embodiment. The numbers of these components may each be an integer equals to or larger than three.

Similarly, the phase balance of the two adjacent synthesis paths are considered for achieving a combined-beam. The SP3 Ts of the six second switches SW1 through SW6 may be identical, and the power dividers PD1 through PD6 may be identical. The antenna switching system provided in the present disclosure has a symmetrical architecture, such that the required phase balance may be easily achieved. Furthermore, the low return loss, low insertion loss and equal insertion loss and phases between the two synthesis paths may also be achieved by utilizing the symmetrical architecture.

Figure 6B:
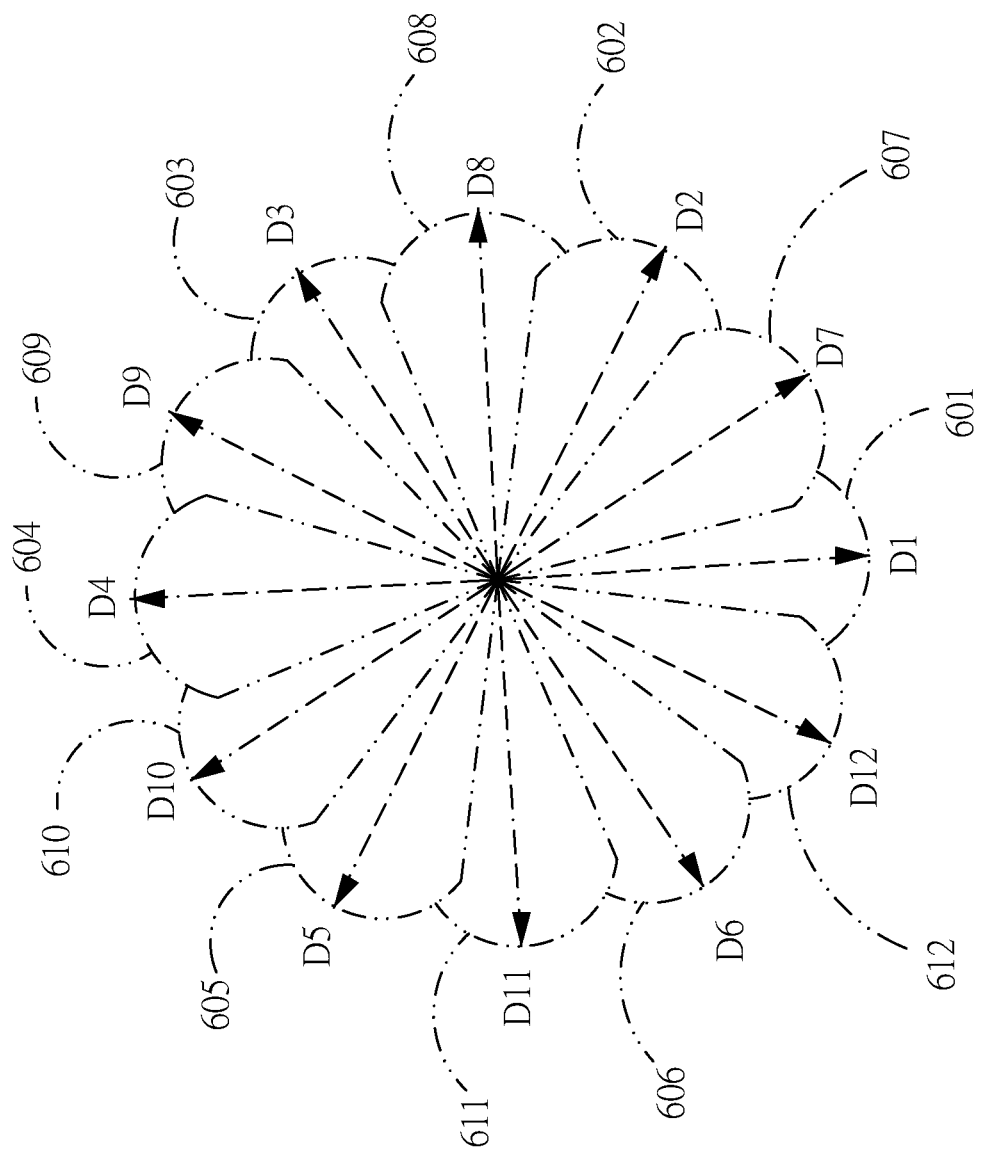
FIG. 6B shows a radiation pattern of the antenna array according to another embodiment of the present disclosure.

Reference is now made to FIGS. 6A and 6B. FIG. 6A shows a schematic diagram of the antenna array according to another embodiment of the present disclosure, and FIG.

6B shows a radiation pattern of the antenna array according to another embodiment of the present disclosure.

The antenna array of FIG. 6A includes six antenna sectors. Each antenna sector covers a sector area of about 60 degrees. Each of the antenna sectors may include four antenna elements (e.g., patch antenna) that form a single antenna. Each antenna sectors has, for examples, the first antennas A1-1 through A1-6. Each antenna sector forms a single beam that can transmit and receive RF signals individually, and can also be combined with adjacent antenna sectors to form a combined beam to transmit and receive RF signals. In the embodiment, the first antennas A1-1 through A1-6 are spaced at equal intervals around a circumference of a circle, but the arrangement is not limited to this embodiment, the first antennas A1-1 through A1-6 are spaced at equal intervals along a straight line, or the arrangement may be provided by spacing at unequal intervals to form other shapes.

As shown in FIG. 6B, a first radiation pattern 601 formed by the first antenna A1-1 is toward to a first direction D1, a second radiation pattern 602 formed by the first antenna A1-2 is toward to a second direction D2, a third radiation pattern 603 formed by the first antenna A1-3 is toward to a third direction D3, a fourth radiation pattern 604 formed by the first antenna A1-4 is toward to a fourth direction D4, a fifth radiation pattern 605 formed by the first antenna A1-5 is toward to a fifth direction D5, and a sixth radiation pattern 606 formed by the first antenna A1-6 is toward to a sixth direction D6. When the first common port CP1 is switched to the PD port PDP, a seventh radiation pattern 607 formed by the first antennas A1-1 and A1-2 may be toward to a seventh direction D7, an eighth radiation pattern 608 formed by the first antennas A1-2 and A1-3 may be toward to an eighth direction D8, a ninth radiation pattern 609 formed by the first antennas A1-3 and A1-4 may be toward to a ninth direction D9, a tenth radiation pattern 610 formed by the first antennas A1-4 and A1-5 may be toward to a tenth direction D10, an eleventh radiation pattern 611 formed by the first antennas A1-5 and A1-6 may be toward to a eleventh direction D11, a twelfth radiation pattern 612 formed by the first antennas A1-6 and A1-1 may be toward to a twelfth direction D12. Therefore, a higher angle resolution of radiation patterns can be provided without any dead corner by utilizing the six single beams and six combined beams.

Moreover, when considering that two adjacent first antennas among n first antennas would participate in the combined beam operation, the antenna switching system 12' may be designed according to the following statement: an $i^{th}$ first antenna is electrically connected to an $i^{th}$ switch, where i is an integer from 1 to n−1, and an $i^{th}$ power divider of plurality of power dividers is electrically connected to the $i^{th}$ switch and an $(i+1)^{th}$ switch of the plurality of switches, and a $n^{th}$ power divider is electrically connected to a $n^{th}$ switch and a $1^{st}$ switch of the plurality of switches, and n is equal to the number of the plurality of switches. For example, suppose two first antennas are participating in the combined beam operation, and six first antennas are included in the antenna array and arranged in sequence, i.e., in an order of 1st to $6^{th}$. Therefore, a master switch should be a SP12T switch, and six switches and six power dividers should be provided. Furthermore, the $1^{st}$ first antenna is electrically connected to an $1^{st}$ switch, a $1^{st}$ power divider is electrically connected to the $1^{st}$ switch and an 2nd switch of the six switches, and a 6th power divider is electrically connected to a 6th switch and a $1^{st}$ switch of the six switches.

Specifically, the SP3T/SP6T/SP12T RF switches and 3 dB power divider/combinator used in the present disclosure are commercially available in any frequency band, and generally, the 50-ohm impedance matching of each switch has basically been completed before shipment. No impedance mismatch problem existed for either the single beam or the combined beam operation. The isolation of the single beam for each antenna sector is achieved by the circuit isolation between the adjacent two of the six switches SW1 through SW6 at the last stage. The isolation of the combined beams of two adjacent antenna sectors is achieved by the circuit isolation between the second port and the third port of the 3 dB power split/combinator, and isolations more than 20 dB may be basically achieved by utilizing the SP3T/SP6T/SP12T RF switches and 3 dB power divider/combinator in this architecture.

A single beam or combined beam operation for any number of antenna sectors may also be achieved by simply replacing the power dividers and the switches in the present embodiment, which will be described in more detail hereinafter.

Figure 7:
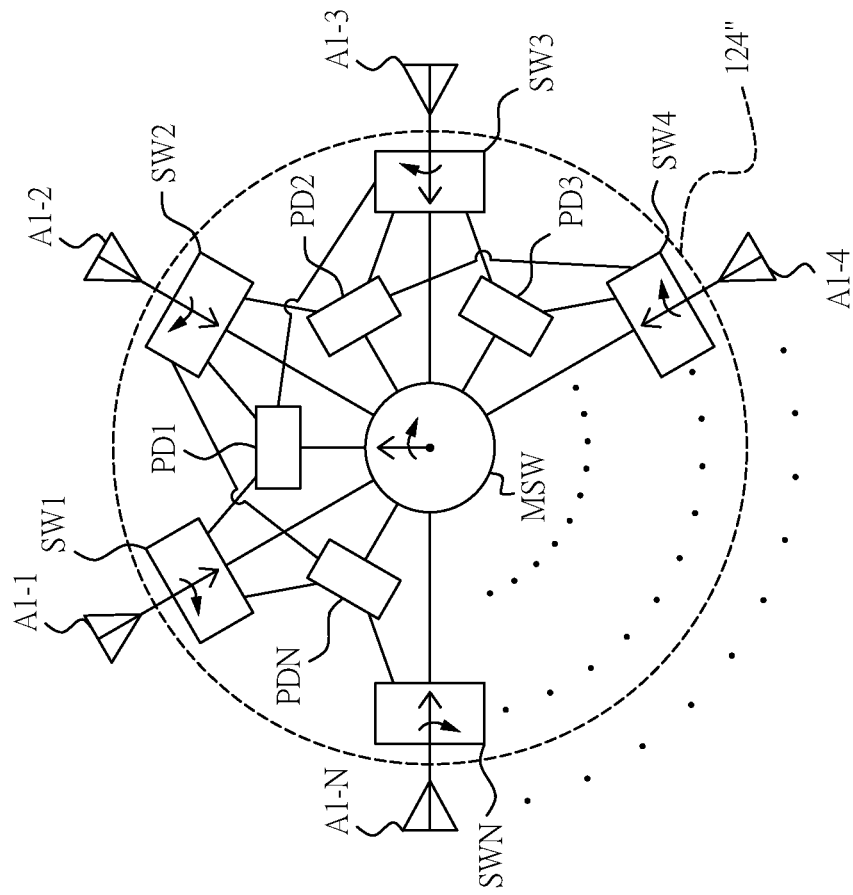
FIG. 7 is a circuit diagram illustrating an antenna switching system constructed according to yet another embodiment of the present disclosure.

Reference is now made to FIG. 7, which is a circuit diagram illustrating an antenna switching system constructed according to yet another embodiment of the present disclosure. As shown in FIG. 7, the antenna switching system 12″ includes the first RF circuit 120, a first switch circuit 124″, and first antennas A1-1 through A1-2N. In the present embodiment, the first RF circuit 120, configurations of the fourth, fifth, sixth ports of each of the switches SW1 through SWN, and configurations of the second and third ports of the power dividers PD1 through PDN are as the same as those depicted in the FIG. 3, therefore, the repeated descriptions are omitted.

In this case, a number of the first ports of the master switch MSW, a number of the PD ports PDP1 through PDPN, a number of the power dividers PD1 through PDN, and numbers of the switches SW1 through SWN may be equal to one another. Each of the power dividers PD1 through PDN may further include a seventh port, and each of the switches SW1 through SWN may further include a eighth port, such that there are three first antennas may participating in the combined beam operation. Specifically, the seventh ports of the power dividers PD1 through PDN are electrically connected to the eighth ports of the switches SW1 through SWN, respectively, and the fifth port, the sixth port, and the eighth port of each of the switches SW1 through SWN are electrically connected to different ones of the power dividers PD1 through PDN, respectively, and each of the power dividers PD1 through PDN may be a 3-way power divider.

In the present embodiments, multiple ports may be further included in each of the power dividers PD1 through PDN and each of the switches SW1 through SWN according to a required number of first antennas participating in the combined beam operation. For example, if four first antennas are expected to participate in the combined beam operation, the power dividers PD1 through PDN may each be a 4-way power divider, and the switches SW1 through SWN may each be a SW4T switch, such that each of the combined beams may be formed by four antenna sectors.

Based on the architecture of the present embodiment, the master switch MSW may further be a SP2NT switch, and each of the switches SW1 through SWN may further be a SP4T switch. The first antennas A1-1 through A1-N are respectively coupled to the third common ports of the switches SW1 through SWN. Furthermore, the first antennas A1-1 through A1-N may be arranged in sequence and spaced at equal intervals around a circumference of a circle, but the arrangement is not limited to this embodiment, the first antennas A1-1 through A1-N may be spaced at equal intervals along a straight line, or the arrangement may be provided by spacing at unequal intervals to form other shapes.

The third common port of each of the switches SW1 through SWN is selectively switched to one of the fourth, fifth, sixth and eighth ports. In more detail, each of the switches SW1 through SWN is powered by a power line and controlled by control lines to select a signal path for the third common port to transmit/receive RF signals through one of the fourth, fifth, sixth and eighth ports. In other words, according to the control lines given to the switches SW1 through SWN, each of the switches SW1 through SWN is configured to couple the third common port P3 to one of the fourth, fifth, sixth and eighth ports.

The present embodiment is an example of the antenna switching system with N antenna sectors. All of the switches can be switched and controlled by the processor 102 through the GPIO interface GPIO. First, when single-beam operation of one of the first antenna A1-1 through A1-N is to be achieved, the first common port CP1 of the master switch MSW is switched to one of the first ports P1, and the third common port CP3 of the switches SW1 through SWN coupled to the selected one of the first antennas A1-1 through A1-N is also switched to the fourth port.

Secondly, when a combined-beam operation of one of the combinations between the two adjacent first antennas among the first antennas A1-1 through A1-N is to be achieved, the first common port CP1 of the master switch MSW is switched to one of the PD ports PDP1 through PDPN corresponding to the selected combination of two adjacent first antennas among the first antennas A1-1 through A1-N, the two switches among the N switches SW1 through SWN coupled to the selected combination of two adjacent first antennas among the first antennas A1-1 through A1-N are switched to couple the two first antennas to the selected power divider. When RF signals pass through the 3 dB power divider PD, the power divider PD divides or combines the RF signals of adjacent antenna sectors to transmit or receive signals. When RF signals pass through the 3 dB power divider PD, the power divider PD divides or combines the RF signals of adjacent antenna sectors to transmit or receive signals. It is notably mentioned that the numbers of the first ports P1, the PD ports PDP1 through PDPN, and the first antennas may be at least three.

From above, the single beam or combined beam operation for any number of antenna sectors may also be achieved by simply adjusting numbers of the ports of the master switch, the numbers and types of the power divider and the switches at last stage in the present disclosure.

Figure 8A:
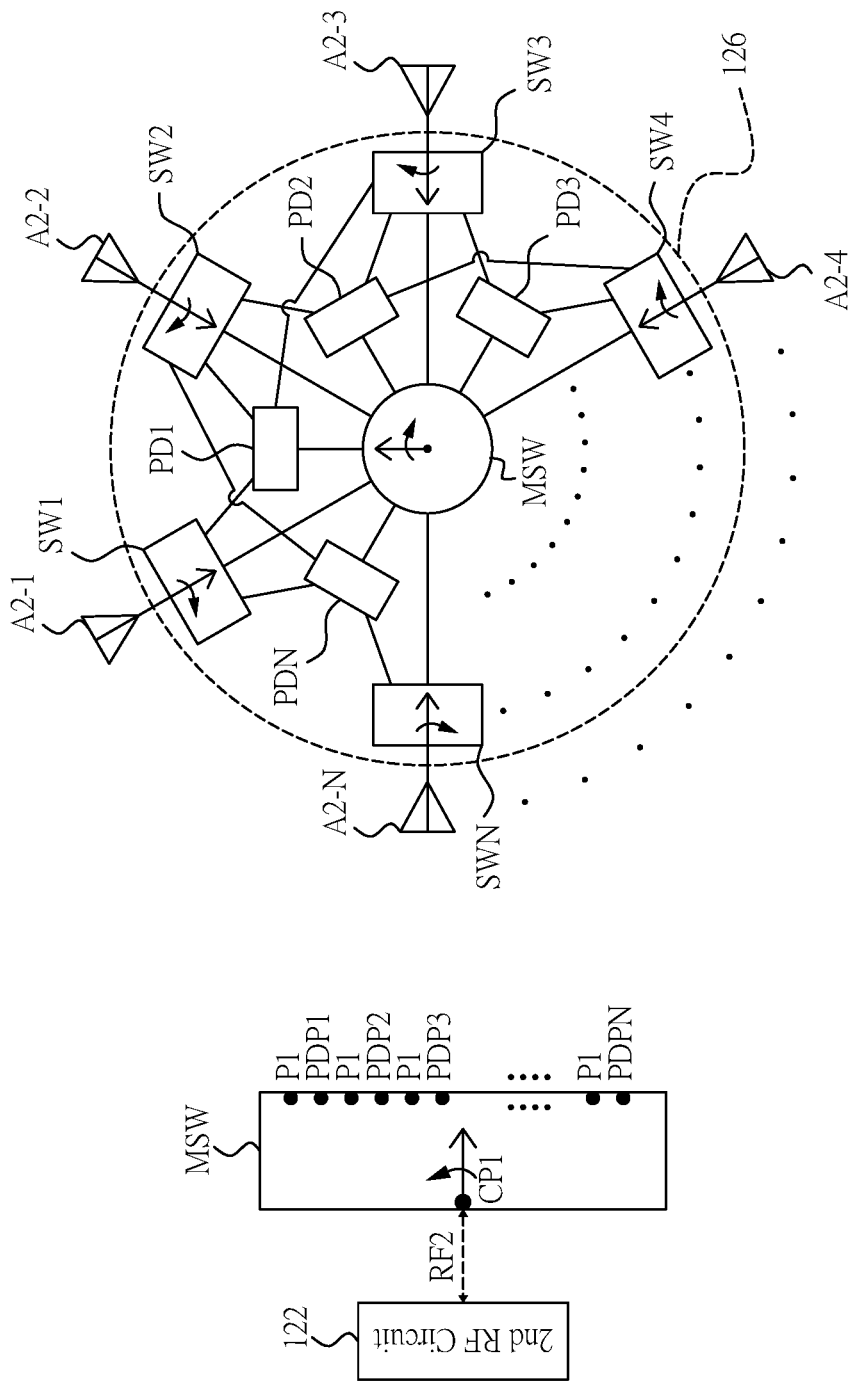
FIG. 8A is a circuit diagram illustrating an antenna switching system constructed according to the present disclosure.
Figure 8B:
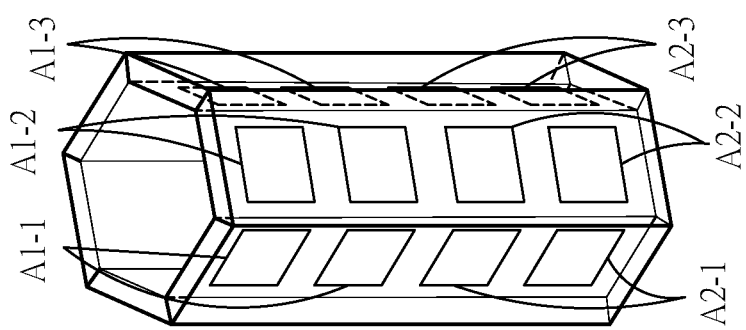
FIG. 8B shows a schematic diagram of the antenna array according to another embodiment of the present disclosure.

Reference is now made to FIGS. 7, 8A and 8B. FIG. 8A is a circuit diagram illustrating an antenna switching system constructed according to the present disclosure, and FIG. 8B shows a schematic diagram of the antenna array according to another embodiment of the present disclosure.

As shown in FIGS. 7, 8A and 8B, the antenna switching system 12 further includes the second RF circuit 122, the second polarization switching circuit 126, and a plurality of second antennas A2-1 through A2-N included in the antenna array 128. The second polarization switching circuit 126 is configured to be as the same as the first polarization switching circuit 124" as depicted in FIG. 7. In this case, the first common port CP1 of the second polarization switching circuit 126 is coupled to the second RF circuit 122, and the second antennas A2-1 through A2-N are coupled to the third common ports of the second polarization switching circuit 126. Similarly, a number of the second antenna A2-1 through A2-N may be at least three. In consideration for providing two types of polarization operation, for example, Horizontal polarization and Vertical polarization operations, the entire antenna array 128, as shown in FIG. 8B, may have a plurality of Horizontal polarization feeding points and a plurality of Vertical polarization feeding points. Furthermore, different types of linear polarization and circular polarization operations may also be provided. Furthermore, types of polarization may be determined according to the positions and orientations of the antennas. For example, each of the antenna sectors may include four patch antennas, two for serving the first antennas A1-1, A1-2 or A1-3, and the other two for serving the second antennas A2-1, A2-2, or A2-3, such that the radiation patterns of the two types of polarization may be provided from each antenna sector. For example, the first antennas A1-1, A1-2 and A1-3 may be constructed as horizontal polarization antennas, and the second antennas A2-1, A2-2, and A2-3 may be constructed as vertical polarization antennas.

Figure 9:
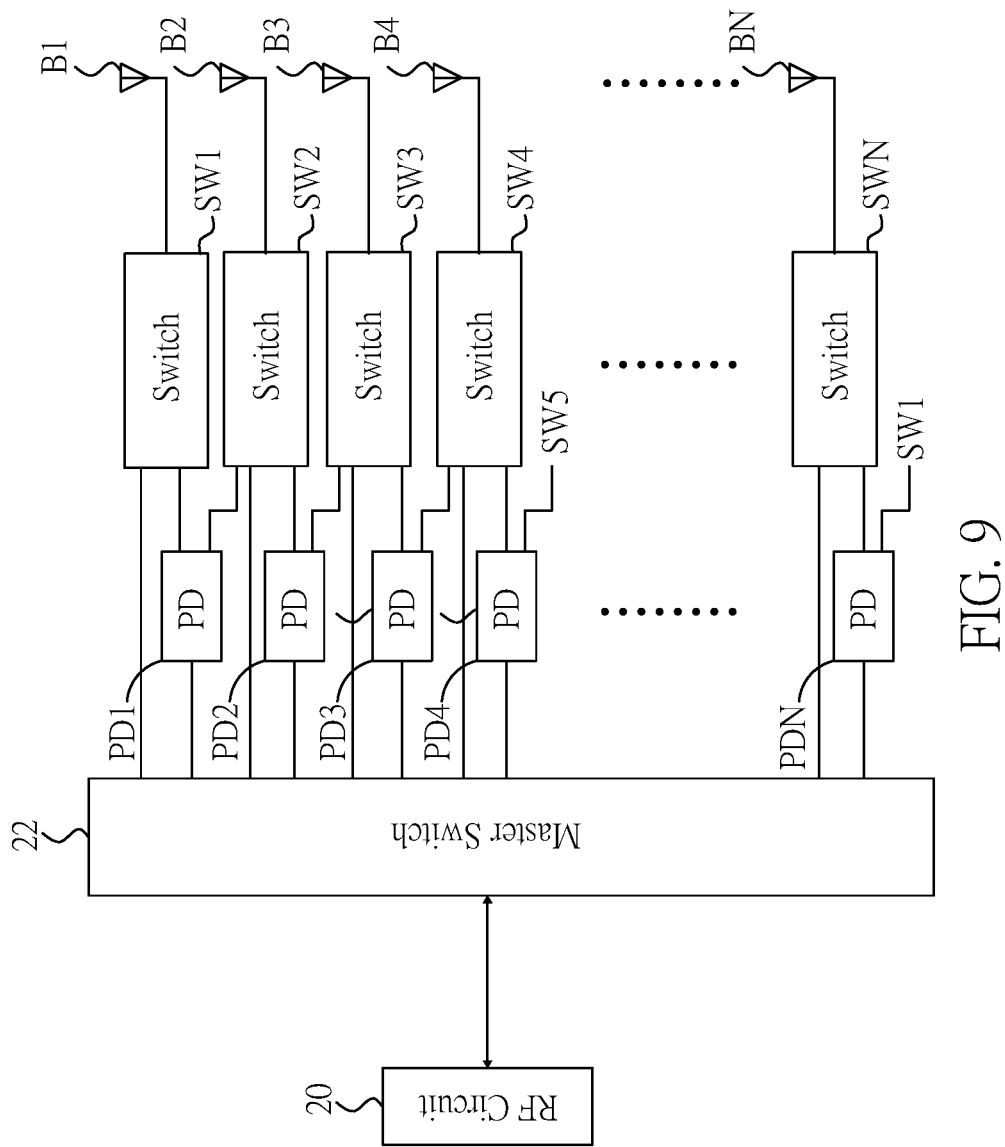
FIG. 9 is a block diagram of an antenna switching system in accordance with another exemplary embodiment of the present disclosure.

FIG. 9 is a block diagram of an antenna switching system in accordance with another exemplary embodiment of the present disclosure. The antenna switching system 2 includes a RF circuit 20 for transceiving signals, N antennas B1 through BN, a master switch 22, N switches SW1 through SWN, power dividers PD1 through PDN. The master switch 22 is electrically connected to the RF circuit 20, a $i^{th}$ switch of the N switches SW1 through SWN is electrically connected between the master switch 22 and a $i^{th}$ antenna of the N antennas B1 through BN, where i is an integer from 1 to N, and N is an integer equal to or larger than 3, and a $j^{th}$ power divider of N power dividers PD1 through PDN is electrically connected between the master switch 22 and a $j^{th}$ switch of the N switches SW1 through SWN, and between the master switch 22 and a $(j+1)^{th}$ switch of the N switches SW1 through SWN, where j is an integer from 1 to N−1.

The $N^{th}$ power divider PDN of the N power dividers PD1 through PDN is electrically connected between the master switch 22 and a $N^{th}$ switch SWN, and between the master switch 22 and a $1^{st}$ switch SW1 of the N switches SW1 through SWN. The signals may be transmitted by one of the N antennas B1 through BN, or the signals may be transmitted by the two antennas of the N antennas B1 through BN corresponding to the two switches among the switches SW1 through SWN connected to one of the N power dividers PD1 through PDN. Specifically, the adjacent two antennas of the N antennas B1 through BN are preferably selected to transmit the signals for achieving better performance and better uniformity of the radiation patterns.

In the present embodiment, the master switch 22 may be a SP2NT switch, the power dividers PD1 through PDN may each be a Wilkinson power divider, and the switches SW1 through SWN may each be a SPDT switch. Therefore, signals may be transmitted by one of the first antenna B1 through BN in the single beam operation, or may be transmitted by one of combinations between two adjacent first antennas among the first antenna B1 through BN. The antenna switching system provided in the present embodiment has a symmetrical architecture, such that the required phase balance may be easily achieved. Similarly, the N first antennas B1 through BN may be arranged in sequence, i.e., in an order of B1, B2, . . . BN, and the N first antennas B1 through BN may be arranged in a circle.

Figure 10:
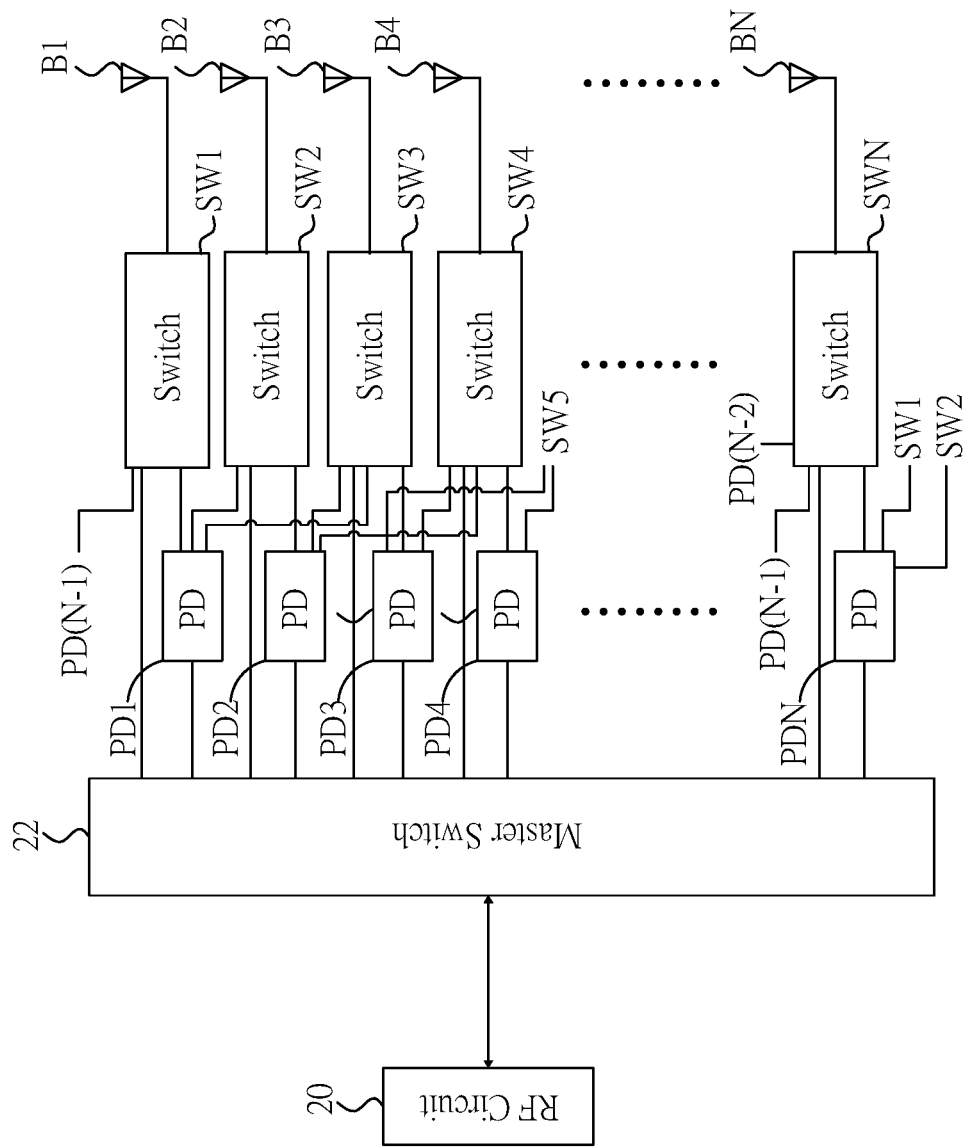
FIG. 10 is a block diagram of an antenna switching system in accordance with another exemplary embodiment of the present disclosure.

FIG. 10 is a block diagram of an antenna switching system in accordance with another exemplary embodiment of the present disclosure. As shown in FIG. 10, the antenna switching system 2' is almost the same as those depicted in the FIG. 9, except that three antennas of N antennas B1 through BN would participate in each of the combined beam operations.

In this architecture, the $j^{th}$ power divider of N power dividers PD1 through PDN is further electrically connected between the master switch 22 and a $(j+2)^{th}$ switch of the N switches SW1 through SWN, and a $(N-1)^{th}$ power divider PD(N-1) of the N power dividers PD1 through PDN is further electrically connected between the master switch 22 and a 1st switch SW1, and the $N^{th}$ power divider PDN of the N power dividers PD1 through PDN is further connected between the master switch 22 and a $2^{nd}$ switch SW2 of the N switches. Furthermore, the power dividers PD1 through PDN may each be a 3-way power divider, and the switches SW1 through SWN may each be a SP3T switch.

In the single beam operation, the signals may transmitted by one of the N antennas B1 through BN, or the signals may be transmitted by three antennas of the N antennas B1 through BN corresponding to the switches connected to one of the N power dividers PD1 through PDN in the combined beam operation. Specifically, the adjacent three antennas of the N antennas B1 through BN are preferably selected to transmit the signals for achieving better performance and better uniformity of the radiation patterns.

In some embodiments, the antennas B1 through BN may be arranged in a circle. In the embodiment, the antennas B1 through BN may be spaced at equal intervals around a circumference of a circle, but the arrangement is not limited to this embodiment, the antennas B1 through BN may be spaced at equal intervals along a straight line, or the arrangement may be provided by spacing at unequal intervals to form other shapes, thereby to form radiation patterns according to the requirement of the designer.

Furthermore, the number of the antennas participated in the combined beam operations may be more than 2. In this case, the numbers of the ports of the power dividers and the switches at last stage may be simply adjusted in order to fulfill the requirement of single beam and combined beam operations. The detailed configuration may be designed according to the embodiments depicted in FIGS. 3, 5, 7 and 8A.

Figure 11:
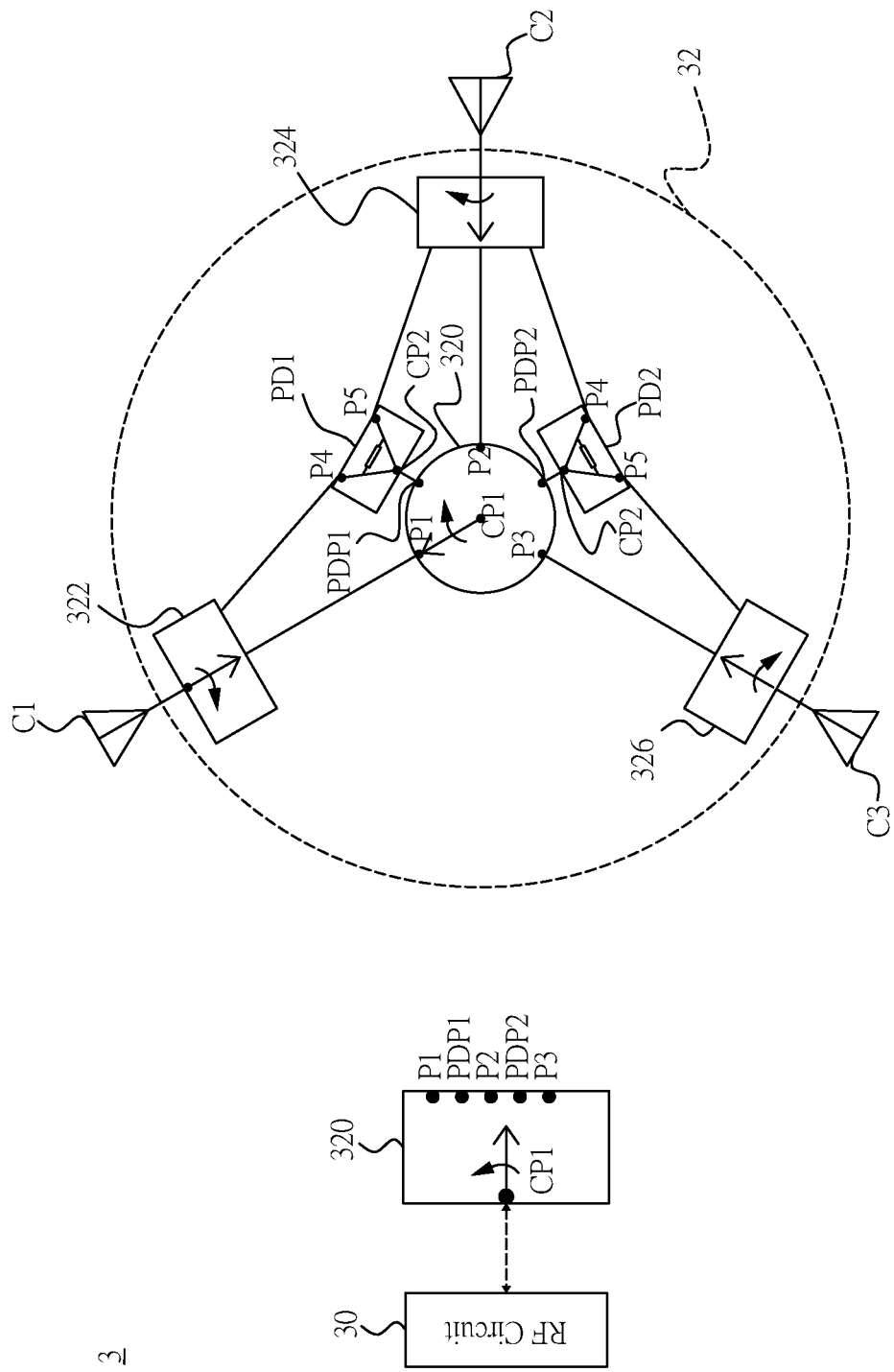
FIG. 11 is a circuit diagram of an antenna switching system in accordance with yet another exemplary embodiment of the present disclosure.

FIG. 11 is a block diagram of an antenna switching system in accordance with yet another exemplary embodiment of the present disclosure. An antenna switching system 3 includes a RF circuit 30, a switch circuit 32, a first antenna C1, a second antenna C2, and a third antenna C3.

The switch circuit 32 includes a master switch 320, a first switch 322, a second switch 324, a third switch 326, a first power divider (PD) PD1 and a second power divider (PD) PD2. The master switch 320 includes a first common port CP1, a first power divider (PD) port PDP1 and a second PD port PDP2, a first port P1, a second port P2, and a third port P3, and the first common port CP1 is electrically connected to the first RF circuit 30.

The first switch 322 is electrically connected to the first antenna C1 and the master switch 320, the second switch 324 is electrically connected to the second antenna C2 and the master switch 320, and the third switch 326 is electrically connected to a third antenna C3 and the master switch 320.

The first power divider (PD) PD1 and a second power divider (PD) PD2 each includes a second common port CP2, a fourth port P4 and a fifth port P5. The second common ports CP2 of the first PD PD1 and the second PD PD2 are electrically connected to the first PD port PDP1 and the second PD port PDP2, respectively, the fourth ports P4 of the first PD PD1 and the second PD PD2 are electrically connected to the first switch 322 and the second switch 324, respectively, and the fifth ports P5 of the first PD PD1 and the second PD PD2 are electrically connected to the second switch 324 and the third switch 326, respectively.

Figure 12:
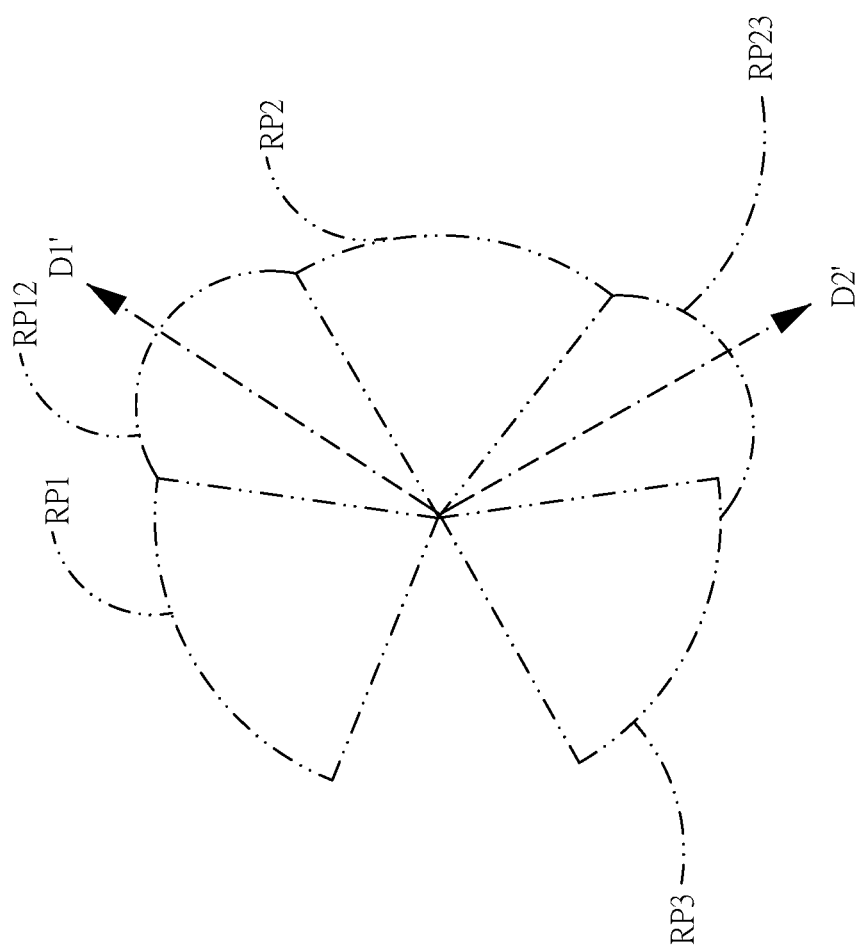
FIG. 12 shows a radiation pattern of the antenna array according to the embodiment of the present disclosure

Reference is now made to FIG. 12, FIG. 12 shows a radiation pattern of the antenna array according to the embodiment of the present disclosure. As shown in the FIG. 12, a first radiation pattern RP1 is formed by the first antenna C1, a second radiation pattern RP2 is formed by the second antenna C2, and a third radiation pattern RP3 is formed by the third antenna C3. When the first common port CP1 is switched to the first PD port PDP1, a radiation pattern RP12 formed by the first antenna C1 and the second antenna C2 is toward to a first direction D1', and when the first common port CP1 is switched to the second PD port PDP2, a radiation pattern RP23 formed by the second antenna C2 and the third antenna C3 is toward to a second direction D2'. Therefore, an angle resolution of radiation patterns can be increased by three single beams and two combined beam.

In certain embodiment, the first switch 322 and the third switch 326 each may be the SPDT as mentioned above, the second switch 324 may be SP3T switch as mentioned above, the first PD PD1 and the second PD PD2 may be Wilkinson power dividers, and the first switch 322, the second switch 324, and the third switch 326 may be controlled by the processor to perform the single beam operation and the combined beam operation.

From above, the antenna switching system of the present disclosure provides a circuit architecture for the smart antenna that may achieve a high angle resolution of radiation patterns by utilizing plural switches, while achieving the required phase balance in the combined-beam operation with the symmetrical architecture. Furthermore, the low return loss, low insertion loss and equal insertion loss and phases between the two synthesis paths may also be achieved by utilizing the symmetrical architecture.

The antenna switching system of the present disclosure is also provided without utilizing any diode. The control circuit for the antenna switching system may operate at low operation voltage and without supplying voltages greater than 5V. Therefore, the system mainboard does not require any DC to DC converters, and the costs may be reduced accordingly.

Moreover, no impedance mismatch existed for either the single beam or the combined beam operation in the antenna switching system of the present disclosure. The isolation of the single beam for each antenna sector may be achieved by the circuit isolation between the switches at the last stage.

Furthermore, design rules are also provided in the present disclosure, such that the single beam or combined beam operation for any number of antenna sectors may also be achieved by simply adjusting the numbers of the ports of the power dividers and the switches at the last stage.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An antenna switching system, comprising:
a first radio frequency (RF) circuit for transceiving signals; and
a first switch circuit, comprising:
a master switch, comprising a first common port, a plurality of power divider (PD) ports and a plurality of first ports, wherein the first common port is electrically connected to the first RF circuit, and a number of the plurality of PD ports is equal to a number of the plurality of first ports and is an integer equal to or larger than 3;
a plurality of power dividers, each comprising a second common port, a second port and a third port, wherein a number of the plurality of power dividers is equal to the number of the plurality of PD ports, and the second common ports of the plurality of power dividers are electrically connected to the plurality of PD ports, respectively;
a plurality of switches, each comprising a third common port, a fourth port, a fifth port and a sixth port, wherein a number of the plurality of switches is equal to the number of the plurality of first ports, the fourth ports of the plurality of switches are electrically connected to the plurality of first ports, respectively, the fifth ports of the plurality of switches are electrically connected to the second ports of the plurality of power dividers, respectively, the sixth ports of the plurality of switches are electrically connected to the third ports of the plurality of power dividers, respectively, and the fifth port and the sixth port of each of the plurality of switches are electrically connected to different ones of the plurality of power dividers, respectively; and
a plurality of first antennas electrically connected to the third common ports of the plurality of switches, respectively, wherein a number of the plurality of first antennas is equal to the number of the plurality of switches,
wherein when the first common port is switched to one of the plurality PD ports electrically connected to a selected one of the plurality of power dividers, the fifth port electrically connected to the selected one of the plurality of power dividers is switched to the third common port, and the sixth port electrically connected to the selected one of the plurality of power dividers is switched to the third common port.

2. The antenna switching system according to claim 1, wherein each of the plurality of power dividers is a Wilkinson power divider.

3. The antenna switching system according to claim 1, wherein the plurality of first antennas are arranged in a circumference of a circle.

4. The antenna switching system according to claim 3, wherein the plurality of first antennas are arranged in sequence, an $i^{th}$ first antenna of the plurality of first antennas is electrically connected to an $i^{th}$ switch of plurality of switches, where i is an integer from 1 to n−1, and an $i^{th}$ power divider of plurality of power dividers is electrically connected to the $i^{th}$ switch and an $(i+1)^{th}$ switch of the plurality of switches, and a $n^{th}$ power divider of the plurality of power dividers is electrically connected to a $n^{th}$ switch and a $1^{st}$ switch of the plurality of switches, and n is equal to the number of the plurality of switches.

5. The antenna switching system according to claim 1, wherein each of the plurality of power dividers further comprises a seventh port, each of the plurality of switches further comprises an eighth port, and
wherein the seventh ports of the plurality of power dividers are electrically connected to the eighth ports of the plurality of switches, respectively, and the fifth port, the sixth port, and the eighth port of each of the plurality of switches are electrically connected to different ones of the plurality of power dividers, respectively,
wherein when the first common port is switched to one of the plurality of PD ports electrically connected to a selected one of the plurality of power dividers, the eighth port electrically connected to the selected one of the plurality of power dividers is further switched to the third common port.

6. The antenna switching system according to claim 5, wherein each of the plurality of power dividers is a 3-way power divider.

7. The antenna switching system according to claim 1, further comprising:
a second radio frequency (RF) circuit;
a second switch circuit configured to be as the same as the first switch circuit, wherein the first common port of the second switch circuit is electrically connected to the second RF circuit; and
a plurality of second antennas electrically connected to the third common ports of the plurality of switches of the second switch circuit, respectively,
wherein a number of the plurality of second antennas is an integer equals to or larger than 3.

8. The antenna switching system according to claim 7, wherein the plurality of first antennas are constructed as horizontal polarization antennas, and the plurality of second antennas are constructed as vertical polarization antennas.

9. An antenna switching system, comprising:
a radio frequency (RF) circuit for transceiving signals;
N antennas;
a master switch electrically connected to the RF circuit;
N switches, wherein a $i^{th}$ switch of N switches is electrically connected between the master switch and a $i^{th}$ antenna of the N antennas, where i is an integer from 1 to N, and N is an integer equal to or larger than 3;
N power dividers, wherein a $j^{th}$ power divider of N power dividers is electrically connected between the master switch and a $j^{th}$ switch of the N switches, and between the master switch and a $(j+1)^{th}$ switch of the N switches, where j is an integer from 1 to N−1, and a $N^{th}$ power divider of the N power dividers is electrically connected between the master switch and a $N^{th}$ switch, and between the master switch and a $1^{st}$ switch of the N switches;
wherein the signals are transmitted by one of the N antennas, or the signals are transmitted by the antennas of the N antennas corresponding to the switches connected to one of the N power dividers.

10. The antenna switching system according to claim 9, wherein the power divider is a Wilkinson power divider.

11. The antenna switching system according to claim 9, wherein the $1^{st}$ through Nth first antenna of the N first antennas are arranged in sequence.

12. The antenna switching system according to claim 11, wherein the N first antennas are arranged in a circle.

13. The antenna switching system according to claim 9, wherein the $j^{th}$ power divider of N power dividers is further electrically connected between the master switch and a $(j+2)^{th}$ switch of the N switches, and a $(N-1)^{th}$ power divider of the N power dividers is further electrically connected between the master switch and a 1st switch, and the $N^{th}$ power divider of the N power dividers is further connected between the master switch and a $2^{nd}$ switch of the N switches.

14. An antenna switching system, comprising:
  a radio frequency (RF) circuit for transceiving signals; and
  a switch circuit, comprising:
    a master switch, comprising a first common port, a first power divider (PD) port and a second PD port, a first port, a second port, and a third port, wherein the first common port is electrically connected to the RF circuit;
    a first switch, electrically connected to a first antenna and the master switch;
    a second switch, electrically connected to a second antenna and the master switch;
    a third switch, electrically connected to a third antenna and the master switch; and
    a first power divider (PD) and a second power divider (PD), each comprising a second common port, a fourth port and a fifth port, wherein the second common ports of the first PD and the second PD are electrically connected to the first PD port and the second PD port, respectively, the fourth ports of the first PD and the second PD are electrically connected to the first switch and the second switch, respectively, and the fifth ports of the first PD and the second PD are electrically connected to the second switch and the third switch, respectively;
  wherein when the first common port is switched to the first PD port, a radiation pattern formed by the first antenna and the second antenna is toward to a first direction, and when the first common port is switched to the second PD port, a radiation pattern formed by the second antenna and the third antenna is toward to a second direction.

15. The antenna switching system according to claim 14, wherein the first PD and the second PD are Wilkinson power dividers.

* * * * *